United States Patent
De Los Santos Vilchez et al.

(10) Patent No.: US 11,301,565 B2
(45) Date of Patent: Apr. 12, 2022

(54) METHOD AND SYSTEM FOR DETECTING MALICIOUS SOFTWARE INTEGRATED IN AN ELECTRONIC DOCUMENT

(71) Applicant: Telefonica Cybersecurity & Cloud Tech S.L.U., Madrid (ES)

(72) Inventors: Sergio De Los Santos Vilchez, Madrid (ES); Pedro Pablo Pérez García, Madrid (ES); José Torres Velasco, Madrid (ES)

(73) Assignee: Telefonica Cybersecurity & Cloud Tech S.L.U., Madrid (ES)

( * ) Notice: Subject to any disclaimer, the term of this patent is extended or adjusted under 35 U.S.C. 154(b) by 301 days.

(21) Appl. No.: 16/471,000

(22) PCT Filed: Dec. 19, 2016

(86) PCT No.: PCT/ES2016/070908
§ 371 (c)(1),
(2) Date: Jun. 19, 2019

(87) PCT Pub. No.: WO2018/115534
PCT Pub. Date: Jun. 28, 2018

(65) Prior Publication Data
US 2020/0089880 A1    Mar. 19, 2020

(51) Int. Cl.
*G06F 21/56*    (2013.01)

(52) U.S. Cl.
CPC .......... *G06F 21/563* (2013.01); *G06F 21/564* (2013.01); *G06F 21/566* (2013.01); *G06F 2221/033* (2013.01)

(58) Field of Classification Search
CPC .... G06F 21/563; G06F 21/564; G06F 21/566; G06F 21/562; G06F 21/56; G06F 2221/033
See application file for complete search history.

(56) References Cited

U.S. PATENT DOCUMENTS 8,695,096 B1    4/2014  Zhang
9,852,297 B1 *  12/2017  Long ................... G06F 21/565
(Continued)

FOREIGN PATENT DOCUMENTS

WO    WO 2014/089744    6/2014
WO    WO 2018/115534    6/2018

OTHER PUBLICATIONS

Supplementary European Search Report and the European Search Opinion dated Jun. 18, 2020 From the European Patent Office Re. Application No. 16924353.2. (8 Pages).
(Continued)

*Primary Examiner* — Nelson S. Giddins (57) ABSTRACT

The present invention relates to the detection of malicious software in electronic documents and comprises: detecting an executable code in the electronic document provided to a client module; extracting information from the electronic document comprising the executable code and metadata of the electronic document; creating a binary vector associated with the electronic document; comparing, in a classifier module (200), the binary vector with one or more groups of vectors previously classified and stored in a database (400); classifying the vector in one of the groups, where each group has associated therewith a verdict about the presence of malicious software; and determining that the document contains malicious software depending on the verdict associated with the group in which its associated vector has been classified.

14 Claims, 5 Drawing Sheets

(56) References Cited

U.S. PATENT DOCUMENTS

2010/0192222 A1 7/2010 Stokes et al.
2011/0247072 A1* 10/2011 Staniford .............. G06F 21/566
   726/24
2016/0335432 A1 11/2016 Vatamanu et al.

OTHER PUBLICATIONS

International Search Report and the Written Opinion dated Sep. 6, 2017 From the International Searching Authority Re. Application No. PCT/ES2016/070908. (15 pages).
Nissim et al. "Detection of Malicious PDF Files and Directions for Enhancements: A State-of-the Art Survey", Computers & Security, 48: 246-266, Nov. 3, 2014.
Pesce Document Metadata, the Silent Killer, SANS Institute InfoSec Reading Room, Sans.org, pp. 1-69, Retrieved on Aug. 4, 2017, Published on Apr. 17, 2015.
Wikipedia Cluster Analysis, Wikipedia.org, pp. 1-16, Retrieved Aug. 4, 2017, Published on Dec. 18, 2016.
Wikipedia "Servidor de Aplicaciones", Wikipedia.org, pp. 1-2, Retrieved Aug. 4, 2015, Published on Sep. 20, 2015.

* cited by examiner

METHOD AND SYSTEM FOR DETECTING MALICIOUS SOFTWARE INTEGRATED IN AN ELECTRONIC DOCUMENT

RELATED APPLICATION

This application is a National Phase of PCT Patent Application No. PCT/ES2016/070908 having International filing date of Dec. 19, 2016, the contents of which are all incorporated by reference as if fully set forth herein in their entirety.

FIELD AND BACKGROUND OF THE INVENTION

The present invention is applicable in the technical sector of computer security, and it more specifically relates to the detection of malicious software integrated in electronic documents, such as Excel spreadsheets or PDF documents, for example.

The use of script languages integrated in documents started for the purpose of adding additional functionalities to these documents and thus providing them with dynamic properties which allow, for example, performing actions on a set of cells in an Excel document, enabling a PDF file to be editable, or embedding multimedia objects in Word files.

Today, these functionalities have become the target of attack used by malware creators for executing their creations in systems. In that sense, attackers program documents and files with integrated dynamic languages that extend their functionality for the execution of malicious actions in the system, such as downloading and executing certain content or sending junk mail to contacts stored in the mail client.

The most used languages are Visual Basic for Applications (VBA) and Javascript. VBA is the language used for creating macros in Office. Depending on the Office version used, there are different formats and extensions. Up until now, files with a .doc extension created with Office before 2007 (and therefore normally OLE objects themselves) may or may not contain macros, without the user noticing any difference in their name or extension. Since Office 2007, there is a specific type of file with the .DOCM extension, which means that a document contains macros and its icon includes a warning signal. However, today's Office packages are fully compatible with the .doc format, so it is still used by attackers. They also use .docm formats (to a lesser extent), as they are confident that the user will not detect the risk the extension represents.

JavaScript, which was developed for creating interactive web pages in a simple manner, can be integrated in PDF documents to give them extra functionalities, such as allowing them to be interactive, for example. The most common use of JavaScript in documents of this type is in the incorporation of forms in the document, which in turn translates into formatting data, calculating data, validating it, and assigning actions to given events. JavaScript code, unlike plugins, can be embedded directly in the PDF document and distributed directly with it. Historically, JavaScript has been used by attackers for attacking vulnerabilities in PDF readers which are taken advantage of through documents in this format.

The state of the art of the antivirus industry comprises apparatus, system, or control flow solutions which allow analyzing and detecting malware in documents, and more specifically in macros. Among those documents, patent document U.S. Pat. No. 6,697,950 B1, which describes the way to extract the macro from a document, analyze code operations and flow by comparing them with a previously categorized database, and issue a verdict, stands out the most. This code analysis, in addition to not contemplating any measure for preserving user privacy, is quite basic and its entire computational load is limited to a simple comparison with the database.

Other solutions lean towards detecting malware in a macro based on the code used for creating it. Thus, patent document U.S. Pat. No. 7,493,658 B2 processes the source code of the macros, separating the code into comments and names of variables and of functions. It studies the frequency and distribution of characters and allows discerning whether or not it is malware.

If a user wishes to know if a document contains command sequence embedded malware, sending the file to scanners or "conventional" malware solutions may compromise the security of the information contained in it because most conventional solutions require the entire document to issue a reliable verdict. Therefore, this may become a dilemma for users who want to scan files but do not want to give away or lose control over the potential private or confidential information contained in the documents.

SUMMARY OF THE INVENTION

The present invention solves the aforementioned problems by taking advantage of the particularities of malicious documents, while at the same time preserving the privacy of the document, since it is not necessary to use its content to offer a fast response about whether said document may contain some type of malicious software. To that end there is presented, in a first aspect of the present invention, a method for detecting malicious software in an electronic document, where the method comprises:
  a) detecting an executable code in the electronic document provided to a client module;
  b) extracting, in the client module, information from the electronic document comprising the executable code and metadata of the electronic document;
  c) creating, in the client module, a binary vector associated with the electronic document based on certain characteristics obtained from the extracted information;
  d) comparing, in a classifier module, the binary vector with one or more groups of vectors previously classified and stored in a database;
  e) as a result of the comparison, classifying the binary vector in one of the groups of previously classified vectors, where each group of vectors has associated therewith in the database a verdict about the presence of malicious software;
  f) determining, in the database, that the electronic document contains malicious software depending on the verdict associated with the group in which its associated binary vector has been classified.

One of the embodiments of the invention contemplates executing steps a)-c) locally in user equipment and executing steps d)-f) in a remote server. Advantageously, the user can thereby preserve his privacy since the electronic document never actually leaves his equipment, only its associated vector does.

Additionally, one of the embodiments of the invention comprises storing in the database the executable code, a summary code of the electronic document, a raw code associated with the electronic document and the binary vector. Advantageously, this allows, on one hand, feeding the database with information for fine-tuning the verdicts eventually issued by the algorithms and/or an analyst, and on the other hand, conserving the electronic document duly identified by means of the summary code, without having to share the electronic document.

According to one of the embodiments of the invention, comparing the binary vector with one or more groups of previously classified vectors comprises calculating a distance between the binary vector and each of the groups of previously classified vectors. Thus, a measurement of the degree of similarity between the associated documents is obtained. Once this distance is obtained, according to one of the embodiments, the classification of the binary vector in one of the groups is performed depending on a maximum group distance. Advantageously, this means that two vectors are clustered in one and the same group if their distances are less than or equal to a previously defined value, and therefore their associated documents are considered to have sufficiently similar characteristics so as to warrant being treated the same.

Additionally, according to one of the embodiments of the invention, classifying the binary vector in one of the groups of previously classified vectors further comprises updating the verdict assigned to the corresponding group.

According to one of the embodiments of the present invention, it is contemplated that the metadata extracted from the electronic document comprises at least one creation date of the electronic document and/or one modification date of the electronic document.

According to one of the embodiments of the present invention, it is contemplated that the verdict about the presence of malicious software assigned to each of the groups of vectors comprises detecting in the executable code a certain number and size of macros or scripts integrated in the electronic document, detecting obfuscated code, detecting gaps between the creation date of the electronic document and the creation date of the executable code, and/or detecting the presence of certain reserved words relating to one or several of the following actions: execution of files, events, file management, file downloading, and library calls.

The present invention contemplates in one of its possible embodiments, the possibility that the verdict about the presence of malicious software assigned to each of the groups of vectors comprises a manual analysis of the database by an analyst. Thus, the classification and clustering services of the present invention can advantageously be trained and improved.

In one of the embodiments of the present invention, the electronic document is programmed, at least in part, with a script language to be selected from Visual Basic for Applications and JavaScript.

A second aspect of the present invention relates to a system for detecting malicious software in an electronic document, where the system comprises:
  a client module (100) configured for receiving the electronic document; detecting an executable code in the electronic document; extracting certain information comprising the executable code and metadata of the electronic document; creating a binary vector associated with the electronic document based on certain characteristics obtained from the extracted information;
  a classifier module (200) configured for comparing the binary vector with one or more groups of previously classified vectors; as a result of the comparison, classifying the vector in one of the groups of previously classified vectors; and
  a database (400) configured for associating a verdict with each group of vectors about the presence of malicious software; and determining that the electronic document contains malicious software depending on the verdict associated with the group in which its associated vector has been classified.

Additionally, in one of the embodiments of the invention, an application programming interface configured for interconnecting the client module with the classifier module and the database is contemplated.

In one of the embodiments of the invention, the system further comprises a server, where at least the database and the classifier module are housed in said server.

In one of the particular embodiments of the invention, it is contemplated that the client module is configured for operating locally in user equipment.

Finally, there is presented a computer program comprising computer executable instructions for implementing the described method when executed in a computer, a digital signal processor, an application-specific integrated circuit, a microprocessor, a microcontroller, or any other form of programmable hardware. Said instructions can be stored in a digital data storage medium.

A series of advantages of the present invention can be inferred from the foregoing, among which advantages it should be pointed out that the proposed solution does not have to resort to the known "sandboxing" or process isolation technique; it offers absolute respect for the privacy of the documents and users; it requires a very low computational level; it virtually does not need information from the document to be analyzed itself; and it is resistant to programs which obfuscate code reiterated times.

For better understand of these and other aspects of the invention, its objects and advantages, reference can be made to the following specification and attached drawings.

BRIEF DESCRIPTION OF THE SEVERAL VIEWS OF THE DRAWINGS

To complete the description that is being made and for the purpose of contributing to a better understanding of the features of the invention according to an example of one of the embodiments thereof, several drawings have been attached to said description as an integral part thereof in which the following is depicted in an illustrative and non-limiting manner.

DESCRIPTION OF SPECIFIC EMBODIMENTS OF THE INVENTION

That defined in this detailed description is provided to help fully understand the invention. Accordingly, those having ordinary skill in the art will recognize that variations, changes, and modifications to the embodiments described in the present specification are possible without departing from the scope of the invention. Furthermore, the description of functions and elements that are well known in the state of the art is omitted for the sake of clarity and concision.

The embodiments of the invention can logically be implemented in a wide range of architectural platforms, protocols, devices, and systems, so the specific implementations and designs presented in this document are provided solely for purposes of illustration and comprehension, and never to limit aspects of the invention.

The present invention is based on the study of the behavior and techniques used by attackers when they create integrated malicious software (such as macros or JavaScript) and the manner in which they operate, which is taken advantage of for detecting these malicious documents and clustering them together, preserving the privacy of the document, since is not necessary to use its content to offer a rapid response about whether said document may contain some type of malicious software.

Thus, the present invention keeps the content of the information secure and analyzes the payload, taking advantage of the particularities of the embedded malware for detecting malware with an approach that differs from conventional methods, based on parameters other than signatures or heuristics, for complementing the detection performed by general antivirus software and thus allowing a more effective identification in another layer and with other means, such as automatic learning, for example. Furthermore, it is specifically intended for preserving privacy, and therefore data from the content of the document and personal data of the user that may be inserted in metadata are not used.

In addition to classifying the documents with embedded code script (or sequence code or executable code), depending on whether or not they are susceptible to containing malware, the present invention also contemplates storing the decrypted code in a server, which will be used in future detections and eventually by malware analysts.

For classification and machine learning, a set of characteristics relating to certain aspects of the embedded script language is used, such as for example:

The presence of certain words.

The number of times a given group of words appears.

The number and size of the incorporated modules.

The presence of obfuscated code. Despite the fact that obfuscation seems to make it more difficult for analyzers to know how and what the code does, it can be turned into an advantage for analyzing the obfuscation code itself. Several characteristics of the code resulting from obfuscation algorithms can share characteristics or even make it easier to determine and classify the code.

This makes it possible to convert the documents themselves into anonymous binary vectors which may not be associated with any document in particular, but rather are grouped together in clusters tagged as suspected (malware) or not suspected (goodware) of containing malware. Thus, the vectors can be shared in different degrees, or "distance", by different documents or files. This allows classifying the extracted vectors even more rapidly and with greater precision because by handling controlled ranges under a "maximum distance" concept, two vectors may be considered to belong to the same group if their distances are less than or equal to a value previously defined as the "maximum group distance".

As regards the preservation of the privacy of the document and of the user, the document is pre-processed locally in the client equipment. In this manner, the intelligence applied in the server only receives anonymous data (a characteristic vector) together with other data such as the hash function or (summary code) of the document and the macros it contains, which in no case allow identifying it or associating it with the original document, completely preserving its privacy.

Figure 1:
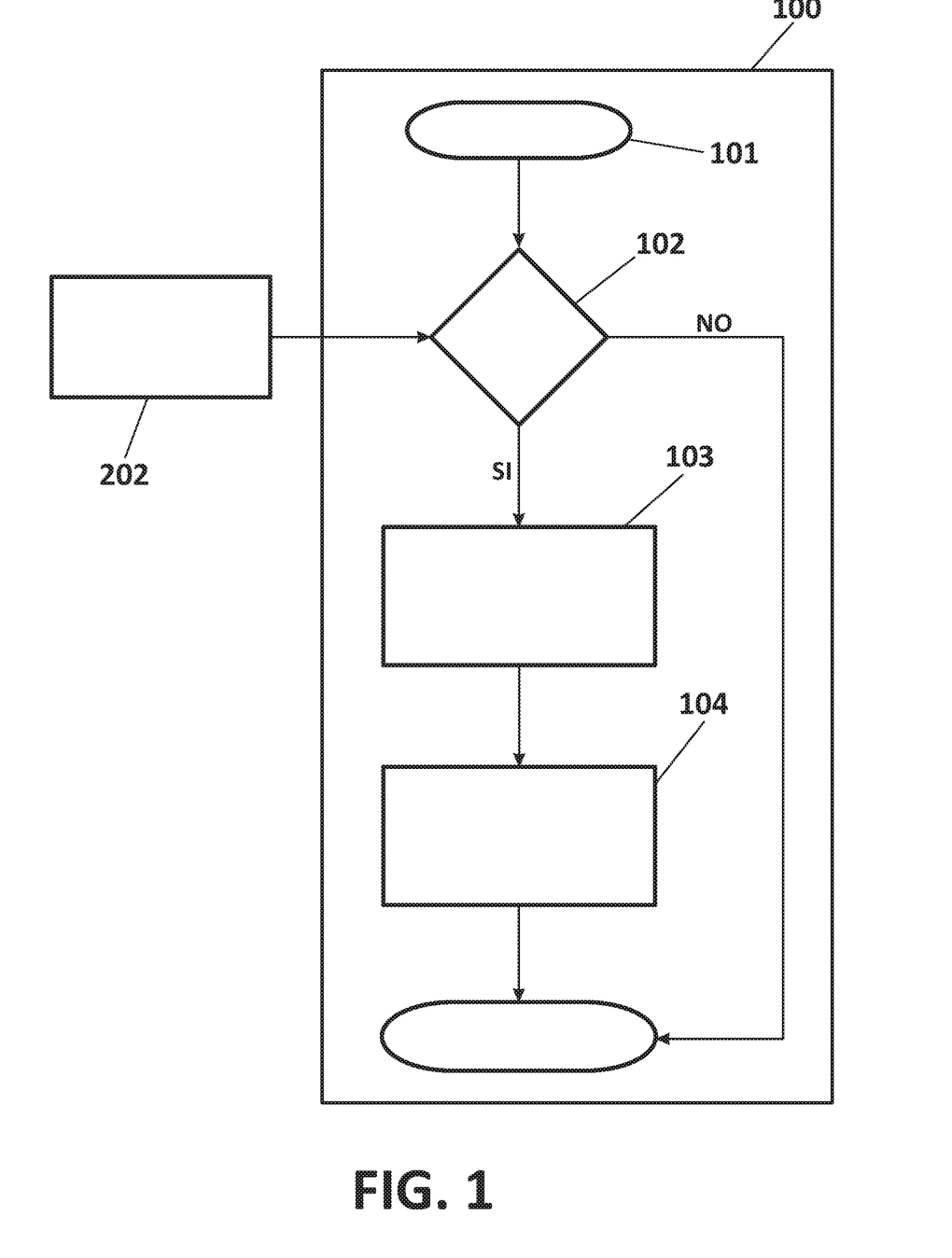
FIG. 1 shows a general diagram of the client module and the pre-processing preferably performed locally in user equipment.

Said pre-processing can be seen in FIG. 1 and it is preferably performed locally in the client equipment, which starts (101) when a user who wants to analyze an electronic document delivers the desired document to a client module (100). It is analyzed whether the document contains some type of executable code (102), and if one should be detected, the metadata and characteristics of the document are extracted (103) and a binary vector is created (104).

The extracted characteristics can be taken from the executable code embedded in the document, besides metadata of the document itself, but always avoiding the metadata of the document which may include sensitive information about the content or about the person responsible for it, so the user is certain that leakage of the private data beyond the control of the client module will never occur.

The client module can reside in different software programs as a complement or extension. It can also be present in servers which process or forward files to be used as a proxy in, for example, file share servers, storage servers, or mail servers.

Programs with embedded malware differ from conventional malware in some aspects, such as for example since they are programmed with a language script, they are not compiled or can be readily decompiled; they often present code obfuscation to render the malware more difficult to analyze; the useful part of the document is present in very particular part of the file structure (completely separated from the content itself); or the attackers cannot go to such low programming levels to prevent detection, so they are forced to include library calls and functions in a mode that is rather standard. Thus, in order to take advantage of these particularities, the data extracted by the present invention may comprise, but is not limited to, the following content:

Presence of reserved words, phrases, or function calls in VBA, JavaScript, or any scripting or embedded language relating to the execution of files, such as: Shell, vbNormal, vbNormalFocus, vbHide, vbMinimizedFocus, vbMaximizedFocus, vbNormalNoFocus, vbMinimizedNoFocus, WScript.Shell, Run, eval, start, open, exec, or require.

Presence of reserved words, phrases, or function calls in VBA, JavaScript, or any scripting or embedded language relating to events such as for example: createEvent, initEvent, event, event.initEvent, element.dispatch Event, dispatch Event, element.fireEvent, fireEvent, eventType, addEventListener, or CustomEvent.

Presence of reserved words, phrases, or function calls in VBA, JavaScript, or any scripting or embedded language relating to the open or close event, such as: AutoExec, AutoOpen, Document Open, DocumentOpen, AutoExit, AutoClose, Document Close, DocumentBeforeClose, DocumentChange, AutoNew, Document New, or NewDocument.

Presence of reserved words, sentences, or function calls in VBA, JavaScript, or any scripting or embedded language relating to the file management such as: Environ, Open, Write, Put, Output, Print, Binary, FileCopy, or CopyFile.

Kill, CreateTextFile, ADODB.Stream, WriteText, SaveToFile, FileReader, File, FileWriter, FileList, Blob, onload, readAsText, DirectoryReader, FileEntry/DirectoryEntry, LocalFileSystem, getFile, requestFileSystem, createWriter, moveTo, copyTo, or remove.

Presence of reserved words, phrases, or function calls in VBA, JavaScript, or any scripting or embedded language relating to file downloading such as: URLDownloadToFileA, Msxml2.XMLHTTP, Microsoft.XMLHTTP, MSXML2.ServerXMLHTTP, or User-Agent Presence of reserved words, phrases, or function calls in VBA, JavaScript, or any scripting or embedded language relating to library calls.

Number and size of the embedded macros or scripts.

Time gap between the creation of a file or documents and the creation of the executable code.

If obfuscated code is detected, the presence of equivalent words.

Therefore, a set of characteristics such as those referred to in a non-limiting manner above is obtained from said information and used to generate a binary vector. The documents are then anonymized by means of transforming them into a binary vector with the necessary characteristics which cannot be univocally associated with any document in particular.

Moreover, through a hash function the client passes the document to a database housed in a server to obtain a reference thereof, but it does not allow retrieving the information contained in said document. Therefore, although the documents are anonymized, they are represented through their hash.

Figure 2:
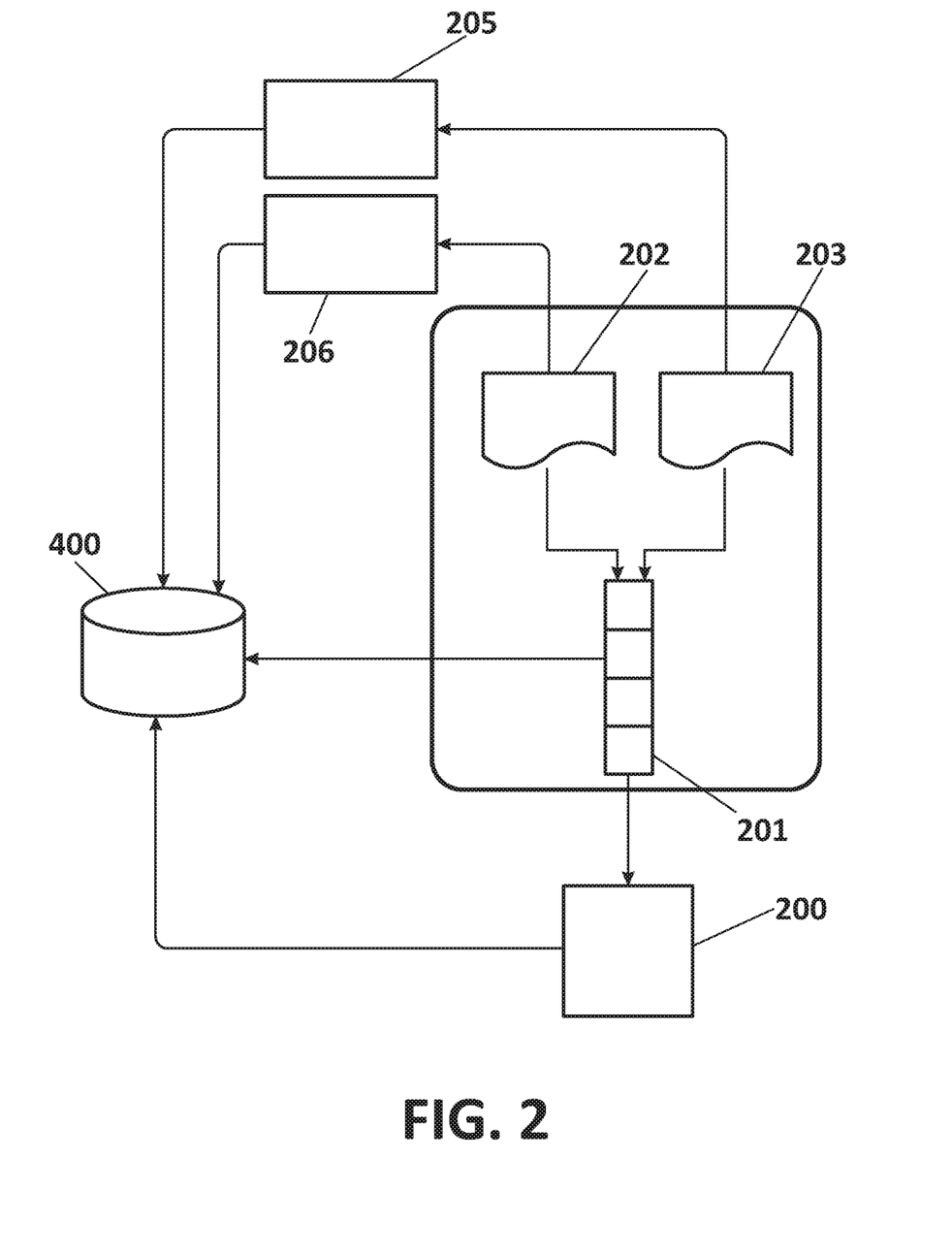
FIG. 2 shows a classifier module according to the present invention.

FIG. 2 describes the classifier module (200) which, preferably housed in a server, obtains an input vector (201) from a client module and tries to classify it by means of a classification algorithm and cluster it with other vectors or groups of vectors, using clustering techniques. The vector does not have to correspond to a single specific document, thus one vector 201 may be common, for example, to a first document (202) and a second document (203). Using a vector and consulting the database, preferably housed in the same server, makes it possible to obtain a rapid response (204), but in the event that a response is not direct, it can use a rapid classifier for determining whether or not the document contains a malicious payload. The executable code (205) with the metadata and hash (206) of the generated document (optional, valid for example for internal actions) are stored in the database described below.

Figure 3:
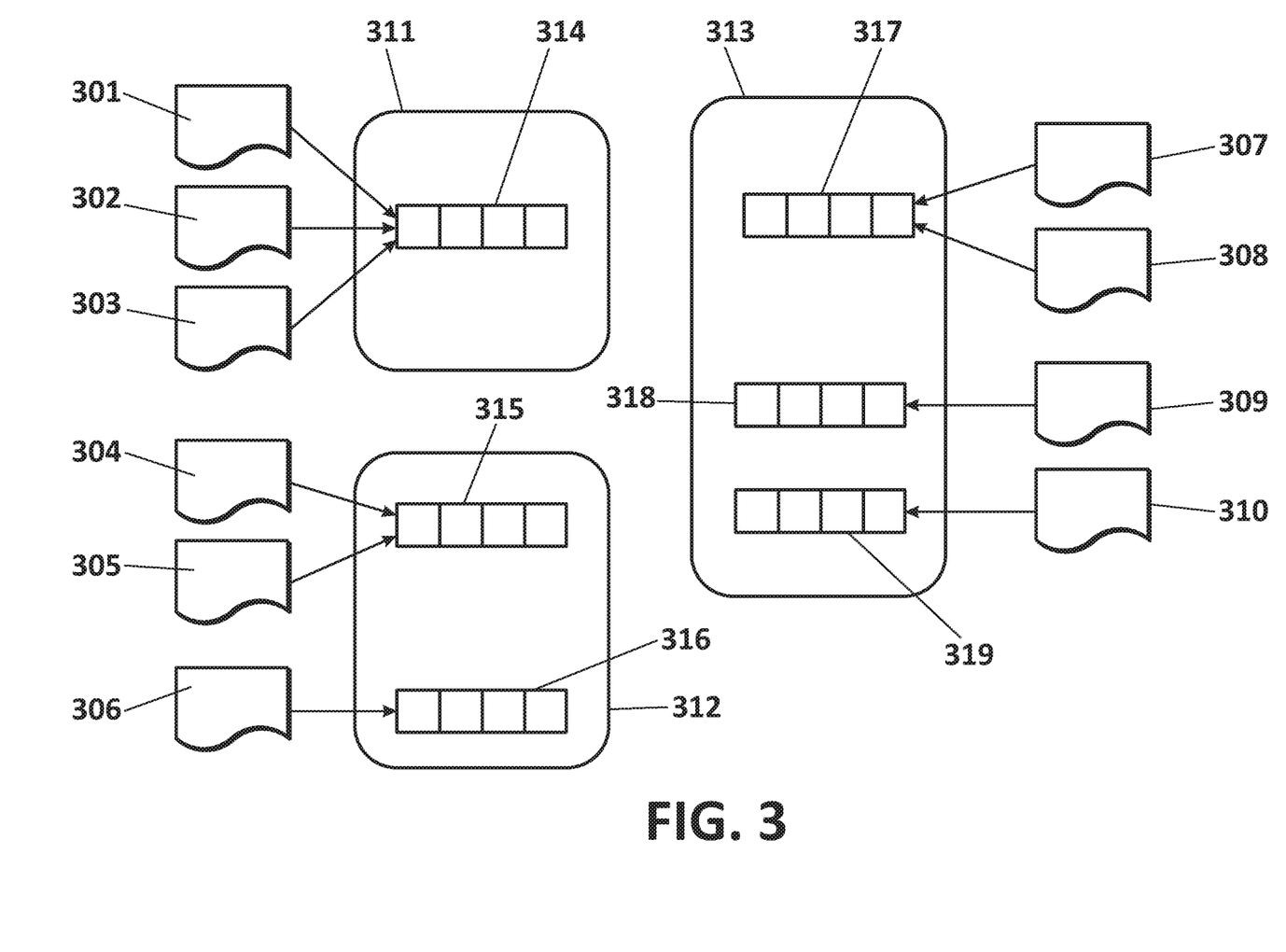
FIG. 3 shows an example of clustering according to an embodiment of the invention.

The vectors can be considered a vector fingerprint, but instead of being associated with a vector, it is associated with a set of documents which either share a vector or else the distance calculated between their vectors is less than or equal to a range established as maximum distance clustering (MDC). The documents can thereby be clustered in a highly efficient manner in groups of documents or clusters of similar characteristics, as depicted by way of example in FIG. 3. The clustering of documents 301-310 of the example with an established MDC equal to 3 results in clusters 311-313. Cluster 311 clusters documents 301-303 in a single vector (314). Cluster 312 clusters documents 304-306 in two different vectors, a first vector (315) shared by documents 304 and 305 and a second vector (306) associated with document 306 which is not equal to vector 315, but the distance between them is less than or equal to the MDC established in this case and equal to 3. Finally, cluster 313 clusters the vectors associated with documents 307-310, where a first vector (317) is shared by documents 307 and 308 and documents 309 and 310 are associated with vectors 318 and 319, respectively, which have a distance between them and with respect to vector 317 that is less than or equal to the MDC established in this case and equal to 3.

The classification algorithm used in one of the embodiments of the invention comprises several machine learning algorithms which use standard techniques carried out under the supervision of the analyst. The classifier can use any algorithm that meets the needs at all times and any algorithm with the highest rate of success at all times. Said algorithms essentially use the information from the groups of vectors stored in the database for classifying which of them are susceptible or not to the documents from which they originate containing malware. From there, this information is used by the classifier, such that when the vector of the document is received from a client module, it identifies which group it would be classified in, and therefore it is rapidly and easily identified if the document associated with that vector is affected by malware, with the client module being informed.

Figure 4:
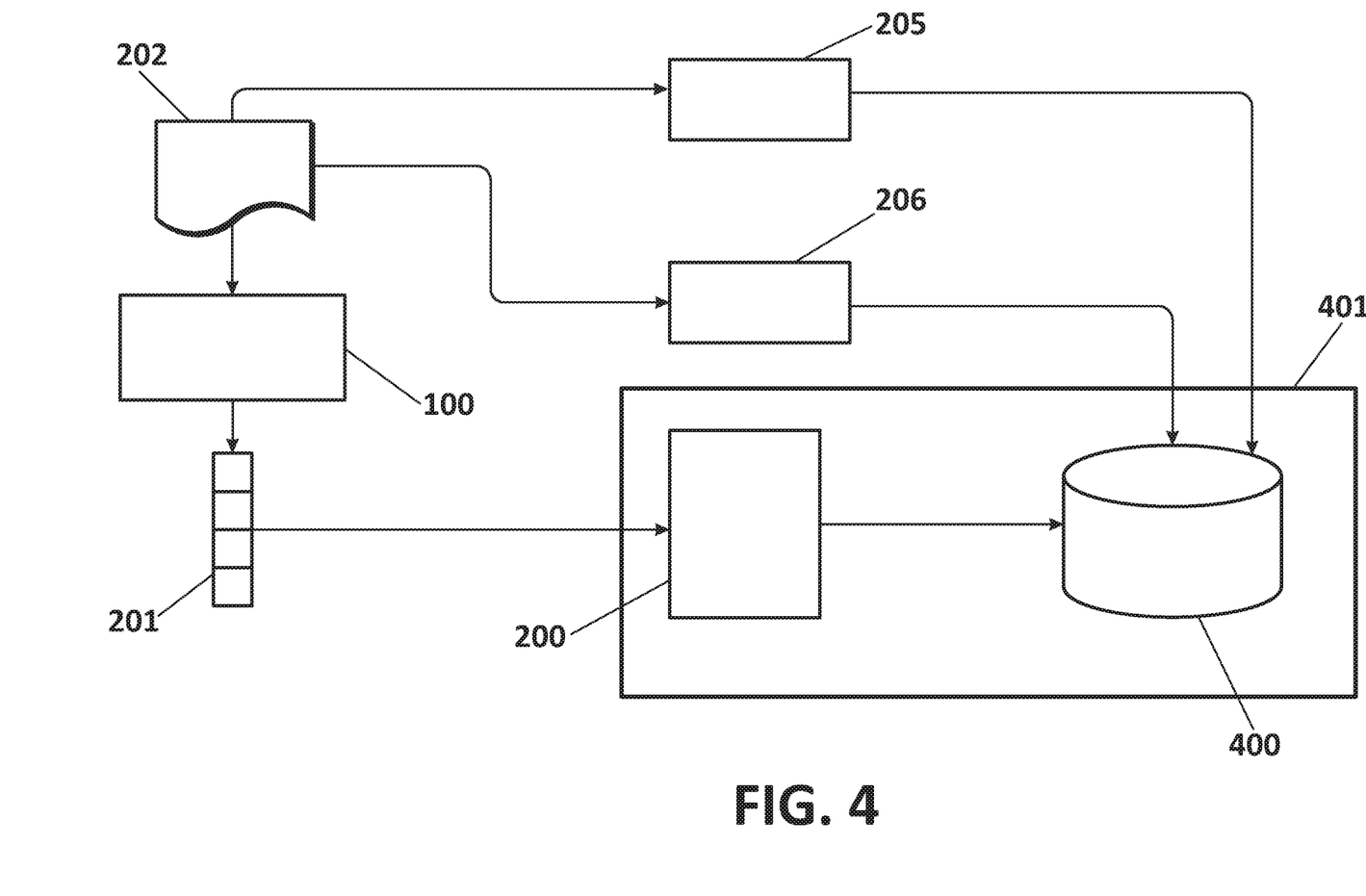
FIG. 4 shows the database according to a particular embodiment of the invention.

The database (400) depicted in FIG. 4 acts like a central repository in a server (401) and its functions include:

storing raw code: the code is stored in raw form in the database, so analysts can train and improve classification and clustering services. Said repository allows analyzing reputation, comparisons, intelligence, and so on and so forth.

storing vectors: it allows comparing vectors and the distance between vectors in an ultrafast and light manner. Comparing not only the vectors themselves but also the distance between the vectors in different groups allows classifying and clustering the documents anonymously.

In one embodiment of the invention, the database additionally houses executable codes, summary codes of the analyzed documents, the verdicts obtained by means of the algorithms used, and the possible corrections, manually input by an analyst.

Figure 5:
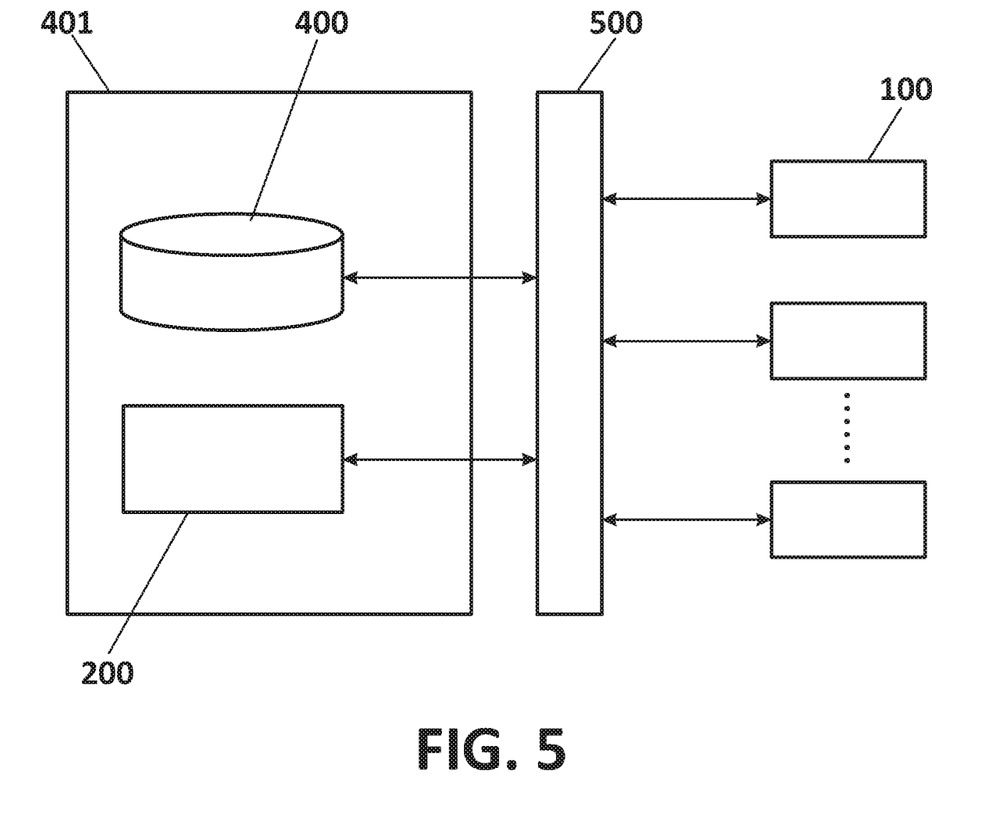
FIG. 5 shows a block diagram of the present invention including an application programming interface for communicating the client modules and the rest of the system.

FIG. 5 illustrates the access framework provided in an embodiment of the invention. The server provides an application programming interface (500) or "API" for communicating with the client modules. This API allows the client to interact with the rest of the system. The API has permission to obtain data and produce a response with a verdict about the payload present in the documents. Additionally, it is contemplated that the API allows users to interact with different degrees of privacy, as required by the actual user, thus, from a client (desktop) or a client (in a server processing or forwarding the document), the client module can use the API to send the complete document to server, to send the raw code, or to directly send a binary vector. There, the sent information (complete document, raw code, or vector) is processed and compared with other documents, raw code, or vectors. In the event of providing the complete document, the comparison is more reliable since it is compared both with other documents and with raw code and stored vectors. In contrast, if raw code is provided directly, the comparison is limited to other raw codes and vectors. Finally, the alternative with a higher degree of privacy involves directly providing a vector, but the comparison may only be performed with other previously stored vectors.

Depending on the coincidences obtained in the comparison, a direct response can be derived, or if it cannot be classified directly, it will be clustered according to the established minimum distance in a group of vectors with similar characteristics and a response will be delivered.

Preferred embodiments of the invention are described in the dependent claims included below.

In this text, the word "comprises" and its variants (such as "comprising", etc.) must not be interpreted in an excluding manner, i.e., they do not exclude the possibility that what is described may include other elements, steps, etc.

The description and drawings simply illustrate the principles of the invention. Therefore, it must be taken in mind that those skilled in the art may devise several arrangements which, though not explicitly described or shown in this document, represent the principles of the invention and are included within its scope. Furthermore, all the examples described in this document are provided primarily for informative purposes to help the reader understand the principles of the invention and the concepts brought by the inventor(s) to improve the technique, and they must be considered as non-limiting with respect to such examples and conditions described in a specific manner. Furthermore, all that set forth in this document relating to the principles, aspects, and embodiments of the invention, as well as the specific examples thereof, cover equivalencies thereof.

Although the present invention has been described in reference to specific embodiments, those skilled in the art must understand that the foregoing and various other changes, omissions, and additions in the form and detail thereof can be performed without departing from the scope of the invention as defined by means of the following claims.

What is claimed is:

1. Method for detecting malicious software in an electronic document, where the method comprises:
    a) detecting an executable code in the electronic document provided to a client module (100);
    b) extracting, in the client module, information from the electronic document comprising the executable code and metadata of the electronic document;
    c) creating, in the client module, a binary vector associated with the electronic document based on certain characteristics obtained from the extracted information;
    d) comparing, in a classifier module (200), the binary vector with one or more groups of vectors previously classified and stored in a database (400);
    e) as a result of the comparison, classifying the binary vector in one of the groups of previously classified vectors, where each group of vectors has associated therewith in the database a verdict about the presence of malicious software;
    f) determining, in the database, that the electronic document contains malicious software depending on the verdict associated with the group in which its associated binary vector has been classified.

2. Method according to claim 1, where steps a)-c) are executed locally in user equipment and steps d)-f) are executed in a remote server.

3. Method according to claim 1, which further comprises storing in the database the executable code, a summary code of the electronic document, a raw code associated with the electronic document and the binary vector.

4. Method according to claim 1, where comparing the binary vector with one or more groups of previously classified vectors comprises calculating a distance between the binary vector and each of the groups of previously classified vectors.

5. Method according to claim 4, where classifying the binary vector in one of the groups of previously classified vectors comprises classifying the binary vector in one of the groups according to a maximum group distance.

6. Method according to claim 1, where classifying the binary vector in one of the groups of previously classified vectors further comprises updating the verdict assigned to the corresponding group.

7. Method according to claim 1, where the metadata extracted from the electronic document comprises at least one creation date of the electronic document and/or one amendment date of the electronic document.

8. Method according to claim 1, where the verdict about the presence of malicious software assigned to each of the groups of vectors comprises detecting in the executable code a certain number and size of macros or scripts integrated in the electronic document, detecting obfuscated code, detecting gaps between the creation date of the electronic document and the creation date of the executable code, and/or detecting the presence of certain reserved words relating to one or several of the following actions: execution of files, events, file management, file downloading, and library calls.

9. Method according to claim 1, where the verdict about the presence of malicious software assigned to each of the groups of vectors comprises a manual analysis of the database by an analyst.

10. Method according claim 1, where the electronic document is programmed, at least in part, with a script language to be selected from Visual Basic for Applications and JavaScript.

11. System for detecting malicious software in an electronic document, where the system comprises:
    a hardware processor of a client equipment, executing code comprising:
        code instructions for receiving the electronic document;
        code instructions for detecting an executable code in the electronic document;
        code instructions for extracting certain information comprising the executable code and metadata of the electronic document; and
        code instructions for creating a binary vector associated with the electronic document based on certain characteristics obtained from the extracted information; and
    a server executing code comprising:
        code instructions for comparing the binary vector with one or more groups of previously classified vectors;
        code instructions for classifying the vector in one of the groups of previously classified vectors, as a result of the comparison;
        code instructions for associating a verdict with each group of vectors about the presence of malicious software; and
        code instructions for determining that the electronic document contains malicious software depending on the verdict associated with the group in which its associated vector has been classified.

12. System according to claim 11, which further comprises an application programming interface configured for interconnecting the client equipment with the server.

13. A computer program product comprising a non-transitory computer readable storage medium storing program code thereon for execution by at least one hardware processor, said program code comprising:
    a) program instructions to detect an executable code in the electronic document provided to a client module (100);
    b) program instructions to extract information from the electronic document comprising the executable code and metadata of the electronic document;
    c) program instructions to create a binary vector associated with the electronic document based on certain characteristics obtained from the extracted information;

d) program instructions to compare the binary vector with one or more groups of vectors previously classified and stored in a database (400);
e) program instructions to classify the binary vector in one of the groups of previously classified vectors, as a result of the comparison, where each group of vectors has associated therewith in the database a verdict about the presence of malicious software; and
f) program instructions to determine that the electronic document contains malicious software depending on the verdict associated with the group in which its associated binary vector has been classified.

14. The computer program product of claim 13, wherein said at least one hardware processor is a member of a group consisting of: a general purpose processor, a digital signal processor, an FPGA, an ASIC, a microprocessor and a microcontroller.

* * * * *